3,341,588
PROCESS FOR PREPARING OXIMES
Lawrence R. Jones, Terre Haute, Ind., assignor to Commercial Solvents Corporation, New York, N.Y., a corporation of Maryland
No Drawing. Filed July 6, 1965, Ser. No. 469,918
7 Claims. (Cl. 260—566)

This invention relates to a process for the production of non-cyclic, aliphatic oximes. In a particular aspect it relates to a process for the production of non-cyclic, aliphatic oximes by the reaction of a water-soluble alkali metal salt of a non-cyclic, aliphatic, secondary nitroparaffin with formic acid.

Non-cyclic, aliphatic oximes have a wide variety of uses. Oximes such as methyl ethyl ketoxime and acetone oxime find special use as anti-skinning agents in coatings. Oximes are obtained by a wide variety of methods. In U.S. Patent 3,136,756, issued June 9, 1964, it is disclosed that a particular cyclic oxime, cyclohexanone oxime is obtained by the reaction of an alkali metal salt of nitrocyclohexane with formic acid. However, the process requires that the reaction be conducted in the presence of substantial quantities of a reducing agent. Reducing agents specifically mentioned are hydrogen sulfide, sulfur dioxide, hydroxylamine and mixtures of zinc and hydrochloric acid. In the patented process the reducing agents are employed in at least the same molecular amount as the nitrocyclohexane salt and preferably in excess of that amount. In addition to increasing the raw material costs of the process such reducing agents tend to be noxious, difficult to handle and/or corrosive to conventional metal equipment.

It is an object of the present invention to provide a process for the production of non-cyclic, aliphatic oximes.

Further objects and advantages of the present invention will be apparent from the specification and the appended claims.

It has been discovered in accordance with the present invention that non-cyclic, aliphatic oximes are obtained by reacting a water-soluble alkali metal salt of a non-cyclic, aliphatic secondary nitroparaffin with formic acid without the employment of a reducing agent. The process expressly eliminates the employment of such materials as sulfur dioxide, hydrogen sulfide, hydroxylamine and mixtures of zinc and hydrochloric acid.

The term "secondary nitroparaffin" is taken to mean nitroparaffin wherein the nitro group is attached to a carbon atom which is in turn attached to two and not more than two carbon atoms. Typical secondary nitroparaffins are represented by the formula

wherein R is an alkyl radical having from 1 up to about 3 carbon atoms. Representative nitroparaffins include 2-nitropropane, 2-nitrobutane, 2-nitropentane, 3-nitrohexane, 4-nitroheptane, etc., and the like. Oximes prepared from such typical nitroparaffins are represented by the formula

wherein R is defined as before. Representative oximes include methyl ethyl ketoxime, acetone oxime, ethyl propyl ketoxime, dimethyl ketoxime, dipropyl ketoxime, methyl propyl ketoxime, etc., and the like.

The alkali metal salts (nitroparaffin salts) of use in the present invention may be prepared by any suitable method. For example, 1 mole of 2-nitropropane may be dissolved in an aqueous or a methanolic solution containing 1 mole of sodium hydroxide to obtain the sodium salt of 2-nitropropane. In a similar manner the potassium salt of 2-nitropropane may be prepared utilizing potassium hydroxide.

The reaction of the present invention is preferably carried out in the presence of an inert solvent, that is a solvent inert to the reactants and the reaction products. Suitable solvents include cyclohexane, chloroform, methanol, ethanol, carbon tetrachloride, the paraffin hydrocarbons such as hexane and pentane, etc., and the like. Formic acid may also serve as the solvent. It is preferred to employ a range by weight of reactants to solvent of about 1:5 to about 1:20.

The mole ratio of formic acid to nitroparaffin salt is of importance in the present invention. While oximes are obtained at lower ratios, best results are obtained when the mole ratio of formic acid to nitroparaffin salt is in excess of 1:1; for example within the range of from about 2:1 to 5:1.

The formic acid of use in the present invention may be of any suitable form. For example, either aqueous or anhydrous formic acid may be employed in the present invention. While oximes are obtained when concentrations of aqueous formic acid lower than 70 percent are utilized, best results are obtained when the concentration of formic acid is in excess of 70 percent.

The reaction of the present invention is exothermic and requires no external source of heat. Typically the reaction is carried out at a temperature in the range of from about 15 to about 100° C. Temperatures in the range of about 25 to about 60° C. are preferred.

The oximes produced according to the process of the present invention may be recovered from the reaction medium by any suitable procedure. One such procedure involves neutralizing the reaction medium with a suitable base, extracting the oxime from the neutralized medium with a suitable solvent for the oxime, and finally removing the solvent from the oxime.

The invention will be understood more fully by reference to the following specific examples. It is understood that the examples are presented for purposes of illustration only and are not intended as a limitation of the invention.

Example 1

7.0 grams of 2-nitropropane and 5.0 grams of sodium hydroxide as pellets were added to 125 milliliters of methanol to form a solution. The solution was then slowly added to a solution prepared by mixing 50 milliliters of anhydrous formic acid with 75 milliliters of methanol. The resulting reaction medium was then agitated for 90 minutes. The reaction medium was neutralized to a pH of 7.0 with aqueous sodium hydroxide and the neutralized reaction medium was extracted with ethyl ether. Acetone oxime was obtained.

Example 2

The procedure of Example 1 is repeated in all essential details with the exception that the potassium salt of 2-nitropentane is substituted for the sodium salt of 2-nitropropane. Methyl propyl ketoxime is obtained.

Example 3

The procedure of Example 1 is repeated in all essential details with the exception that the potassium salt of 2-nitrobutane is substituted for the sodium salt of 2-nitropropane. Methyl ethyl ketoxime is obtained.

Example 4

The procedure of Example 1 is repeated in all essential details with the exception that the sodium salt of 4-nitroheptane is substituted for the sodium salt of 2-nitropropane. Dipropyl ketoxime is obtained.

Since many embodiments of this invention may be made and since many changes may be made in the embodiments described, the foregoing is interpreted as illustrative only and the invention is defined by the appended claims.

I claim:

1. A process for the production of oximes which consists essentially of reacting a water-soluble alkali metal salt of a nitroparaffin with formic acid, the said nitroparaffin having the formula

wherein R is an alkyl radical having from 1 up to 3 carbon atoms, at a temperature in the range of about 15 to about 100° C.

2. The process of claim 1 wherein the reaction is conducted in the presence of an inert solvent.

3. The process of claim 1 wherein the temperature ranges from about 25 to about 60° C.

4. The process of claim 2 wherein the mole ratio of formic acid to nitroparaffin salt is in the range of about 2:1 to about 5:1.

5. The process of claim 2 wherein the concentration of formic acid ranges from about 70 to 100 percent.

6. The process of claim 2 wherein the nitroparaffin is 2-nitropropane.

7. The process of claim 2 wherein the nitroparaffin is 2-nitrobutane.

References Cited

UNITED STATES PATENTS 2,945,065   7/1960   Donaruma _____ 260—566

CHARLES B. PARKER, *Primary Examiner.*

R. V. HINES, *Assistant Examiner.*